May 27, 1924.
F. R. GROFF
ICE MACHINE SLED
Filed July 2, 1921
1,495,840
3 Sheets-Sheet 2
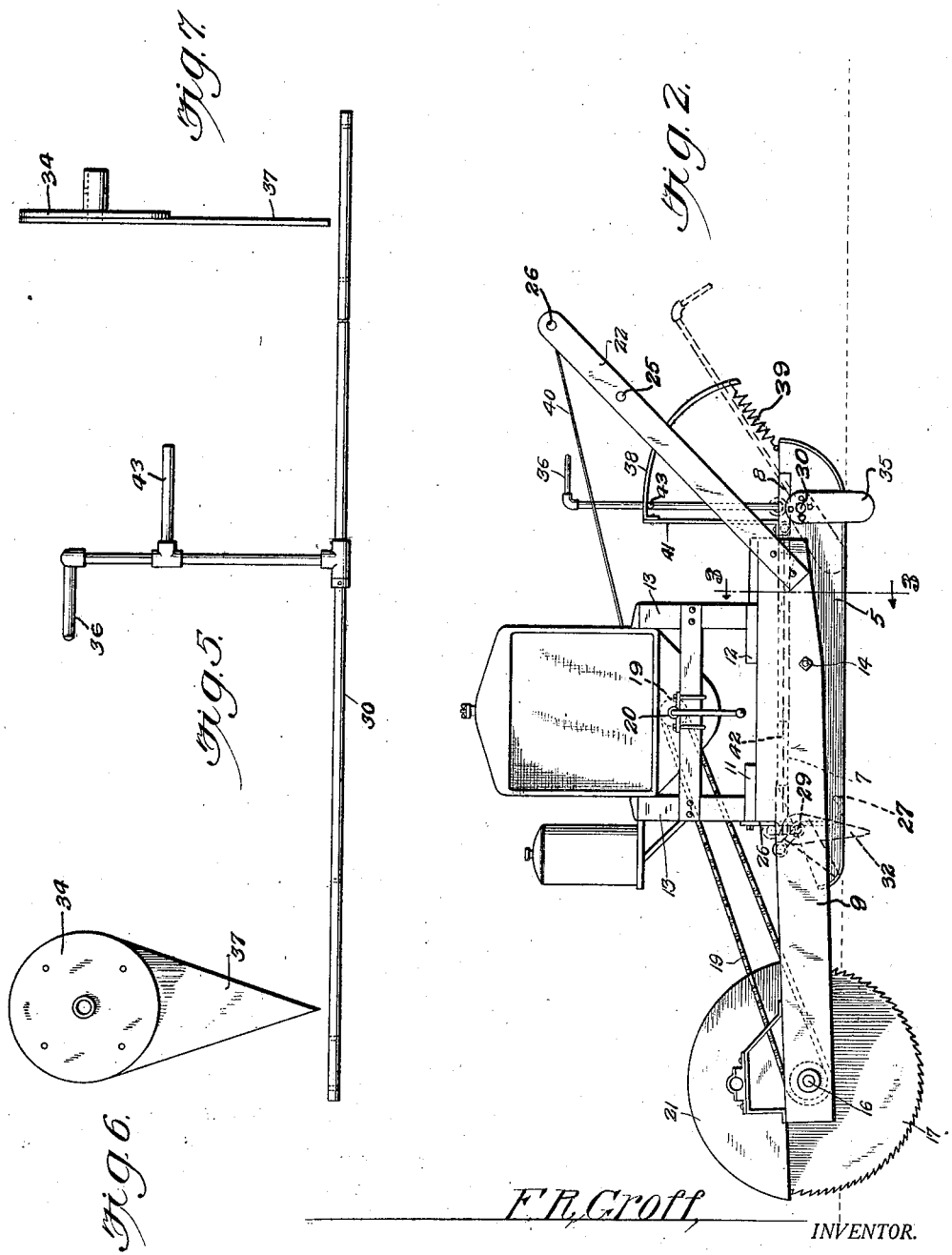
F. R. Groff,
INVENTOR.
BY Geo. P. Kimmel
ATTORNEY.

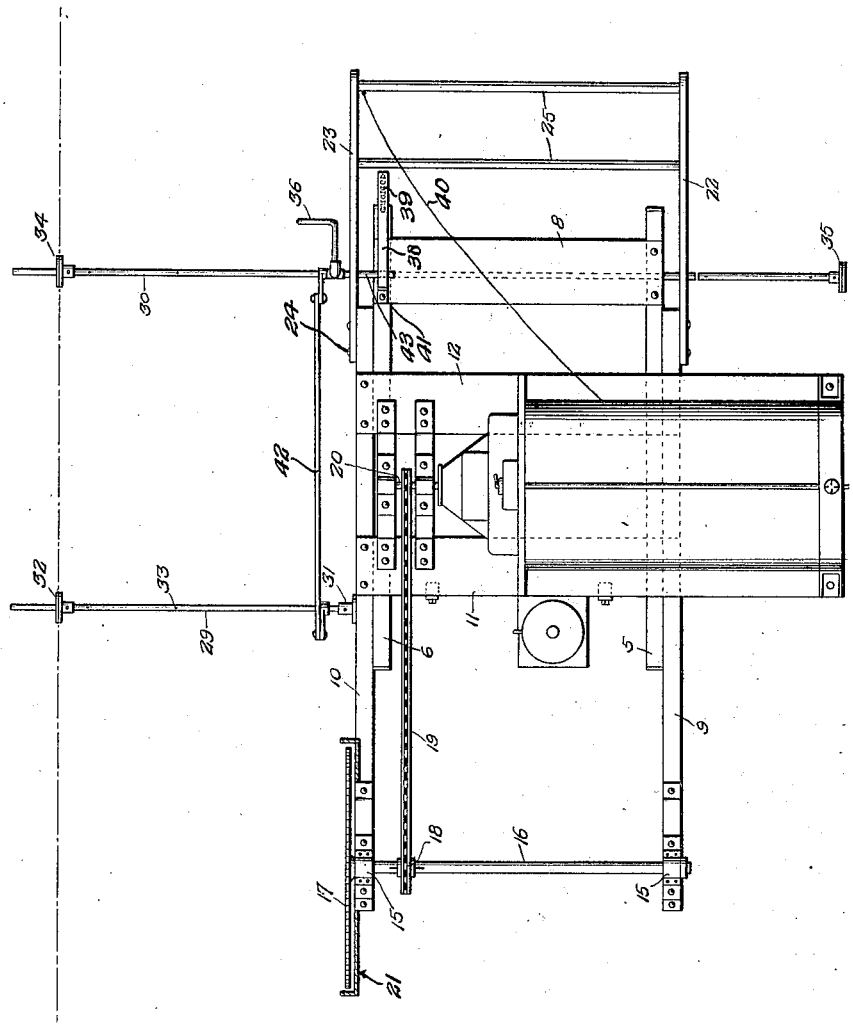

May 27, 1924.
F. R. GROFF
1,495,840
ICE MACHINE SLED
Filed July 2, 1921
3 Sheets-Sheet 3
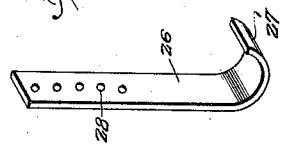
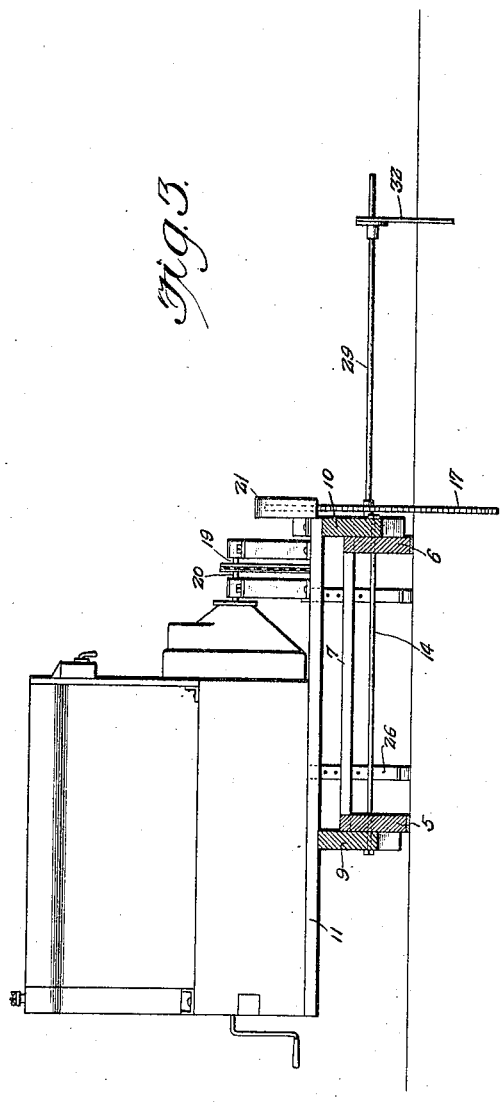
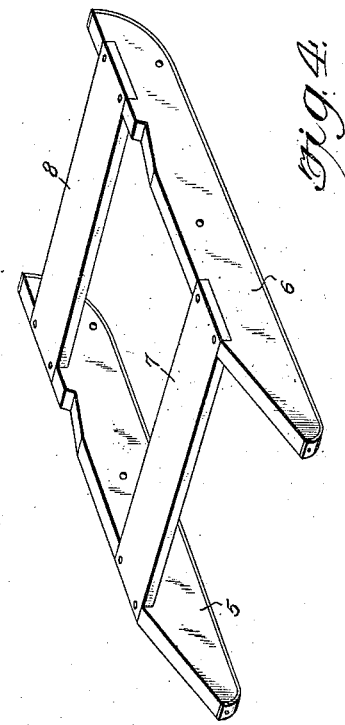
F. R. Groff, INVENTOR.
BY Geo. P. Kimmel, ATTORNEY.

Patented May 27, 1924.

1,495,840

UNITED STATES PATENT OFFICE.

FREDERICK R. GROFF, OF GLOVERSVILLE, NEW YORK.

ICE-MACHINE SLED.

Application filed July 2, 1921. Serial No. 482,286.

*To all whom it may concern:*

Be it known that I, FREDERICK R. GROFF, a citizen of the United States, residing at Gloversville in the county of Fulton and State of New York, have invented certain new and useful Improvements in Ice-Machine Sleds, of which the following is a specification.

This invention relates to ice cutting machines, and more particularly to an ice machine sled for supporting the cutting apparatus and power operating means therefor.

The primary object of the invention resides in a sled support for a field ice cutting machine wherein the frame for the power operating and cutting mechanism may be so mounted and balanced that the same may be easily rocked on its pivot to raise the saw when it is desired to transport the machine.

Another object of the invention consists in the provision of a power operated ice cutting mechanism and adjustable guides therefor, whereby the machine may be guided along a straight line without attention on the part of the operator, including depth gages for the cutter carrying frame for regulating the depth of cut of the saw.

Another and very important object of the invention is the provision of an ice cutting mechanism of the type above set forth in which the parts are extremely simple in construction, easily assembled, rigid and durable, highly efficient in operation, practical, and capable of being manufactured at a very low cost whereby its commercial possibilities are greatly enhanced.

With these objects in view and others which will be manifest and suggested as the purpose and nature of my invention are revealed in the following specification and drawing wherein I have shown a preferred embodiment thereof, Figure 1 is a plan view of the ice cutting apparatus, Fig. 2 is a side view thereof, Fig. 3 is a front view, partly in section, Fig. 4 is a detached view of the sled or runners, Fig. 5 is a detail view of one of the guide supporting rods, Figs. 6 and 7 are detail views of the guides or cutters, and, Fig. 8 is a detached view of one of the depth gages.

Referring now to the drawings wherein like parts designate corresponding parts throughout, the supporting sled for the motor frame and power saw consists of a pair of runners 5, 6, which are connected by a pair of transverse cross bars 7, 8, at the front and rear thereof, the ends of said bars being recessed in the tops of the runners and rigidly secured thereto by lag screws or other fastening elements to form a strong, durable, and rigid supporting structure for the motor frame now to be described in detail.

The motor frame which also supports the power saw consists of a pair of longitudinally extending beams or bars 9, 10, which are connected by transversely extending, flat beams 11, 12, to which the vertical supports 13 are secured whereby the power operating mechanism such as a gasoline engine, electric motor or their equivalent may be secured in the manner shown particularly by Figs. 1 and 2.

Referring to these figures, it will be observed that the side bars 9, 10 are pivotally mounted for rocking movement on a rod or axle 14 which extends through the runners 5 and 6, substantially intermediate the ends thereof. The side beams 9, 10 extend forwardly of the runner members at their forward ends, and are provided with bearings 15 to support a shaft 16 which includes an arbor at one end to carry an ice cutting saw 17. The saw 17 is provided with the usual semi-cylindrical guard or casing 21 mounted on the end of one of the longitudinal beams above referred to.

Secured at 24 to the rear of the beams 9, 10, is a handle structure for the motor frame, consisting of a pair of side bars 22, 23 and connected by cross rods 25 whereby the motor frame may be rocked on its pivot or shaft 14 as will be readily understood from an inspection of Fig. 2. Adjustably secured to the member 11 of the motor frame and between the longitudinally extending side members 9 and 10 are a pair of depth gages 26 with lower curved ends 27 which normally engage the ice field. The stock portions of the gages 26 are each provided with a plurality of spaced apertures indicated at 28 in Fig. 8 to receive holding bolts, to provide for the adjustment of the gages, and thus control the depth of cut of the saws.

The machine is also provided with front and rear gage supporting shafts 29, 30, the front shaft being rotatable in a bearing 31, secured to the side beam 10 and provided with a gage 32 adjustable in any one of a number of apertures 33 formed in the shaft 29 which may thus be positioned in direct alinement with the rear gage 34 whereby the machine may be guided as is well understood. The rear shaft 30 extends through the side runners 5, 6 of the sled and beyond opposite sides thereof, the extended end of the said shaft 30 being provided with an adjustable gage 35. A handle 36 is connected to the rear shaft 30 whereby said shaft may be oscillated to rotate the gages to enter them into the cut or groove made in the ice, or remove them therefrom, as required.

The gage carrying shafts 29 and 30 are connected together as shown at 42, so that upon the operation of the handle 36 both sets of gages 32 and 37 will be simultaneously operated, as above described.

Secured on the rear cross bar 8 of the sled, is a standard 40 provided with a curved member 38 attached to its upper end, said arm 38 being in turn connected by a coiled spring 39 to the side runner 6 as shown in Figure 2.

The curved member 38 is thus yieldably supported at its outer end by the spring 39.

Extending laterally from the handle 36 is an arm 43 which projects beneath the curved yieldably supported member 38 and will hold the handle from forward movement by engaging the standard 41, and thus prevent the gage members 32 and 34 from rearward movement beyond the vertical. As the machine moves forwardly the friction of the members 32 and 34 against the sides of the "score" or channel formed by the saw 17 will be sufficient to retain the members 32 and 34 in vertical position and the contact of the arm 43 against the standard 41 will prevent them from being moved to the rear, as will be obvious.

When the gage members 32 and 34 are to be removed from the "score" or channel at the end of the trip, or when the machine is to be removed, the handle 36 is moved rearwardly into the position shown by dotted lines in Figure 2 which movement will cause the arm 43 to travel beneath the curved member 38 which latter member will be caused by the spring 39 to press with sufficient force against the arm 43 to hold the handle in its rearward position and likewise hold the gage members in withdrawn and inoperative position.

By this construction, it will be readily apparent that the operator may tilt and rock the motor frame and saw carried thereby on the pivot 14 and lock the same in position, it being understood that the depth of cut is regulated by adjusting the depth gages 26 above referred to, and by regulating the speed of the motor through the flexible element 40 connected to the handle device 22. When the machine is once started the same will work regularly and through a straight path without the attention on the part of the operator.

In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described the invention, what I now claim as new and desire to secure by Letters Patent of the United States is:—

An apparatus of the class described comprising a supporting sled and a platform carrying a saw and mounted to tilt upon said platform, a shaft mounted upon said sled and extending beyond the same, a gage member carried by said shaft, an operating handle extending from said shaft, a curved member supported at one end from said sled, a spring connecting said curved member at the other end to said sled, and an arm extending from said operating handle and beneath said curved member and held in frictional contact therewith by the action of said spring.

In testimony whereof I affix my signature hereto.

FREDERICK R. GROFF.